(No Model.)

R. N. ALLEN.
Car Wheel.

No. 240,218. Patented April 19, 1881.

Witnesses:
Henry Sichling
Robt. N. Duncan

Inventor
Richard N. Allen
by Paul A. Duncan
Atty.

N. PETERS, PHOTO-LITHOGRAPHER, WASHINGTON, D. C.

UNITED STATES PATENT OFFICE.

RICHARD N. ALLEN, OF HUDSON, NEW YORK.

CAR-WHEEL.

SPECIFICATION forming part of Letters Patent No. 240,218, dated April 19, 1881.

Application filed February 17, 1881. (No model.)

*To all whom it may concern:*

Be it known that I, RICHARD N. ALLEN, of Hudson, in the county of Columbia and State of New York, have invented a new and useful Improvement in Car-Wheels, of which the following is a specification.

The present invention relates to that class of wheels in which the tire and hub are made separately, instead of being formed in one piece, and are united by means of circular plates secured to the tire and the hub, and forming, in connection with an interposed disk or core, the part of the wheel lying between the tire and the hub; and its object is to provide a strong and durable wheel in which the blows or shocks arising from the impact of the tire upon the rails will be uniformly distributed, and from which the tire can be readily removed when worn or broken and a new one substituted.

Figure 1:
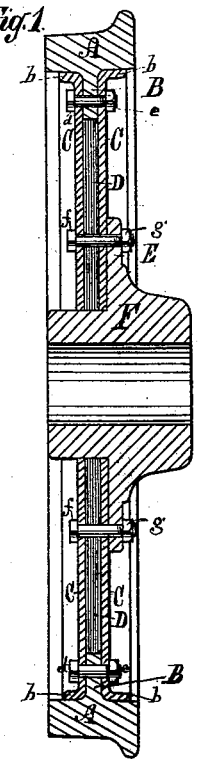
Figure 2:
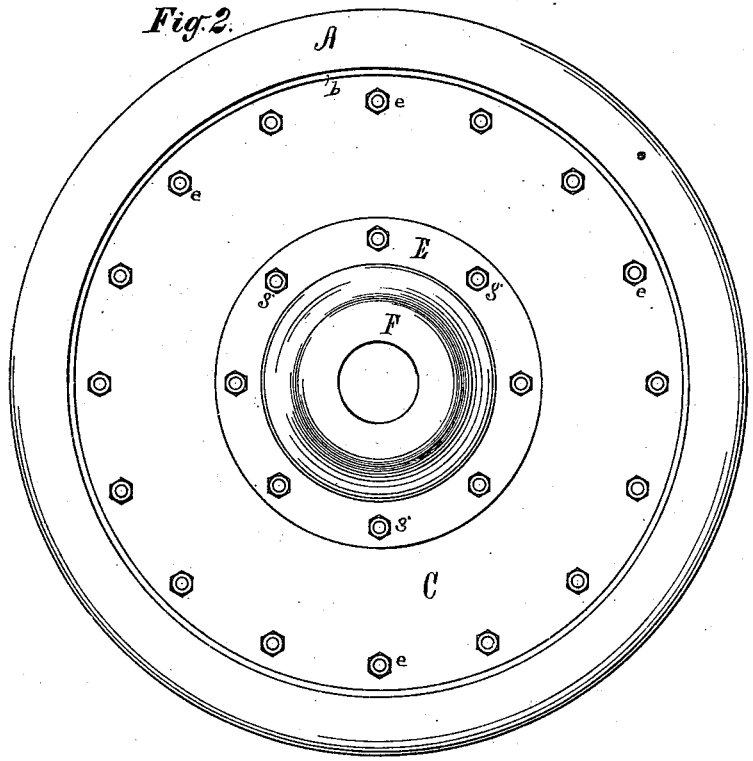
Figure 3:
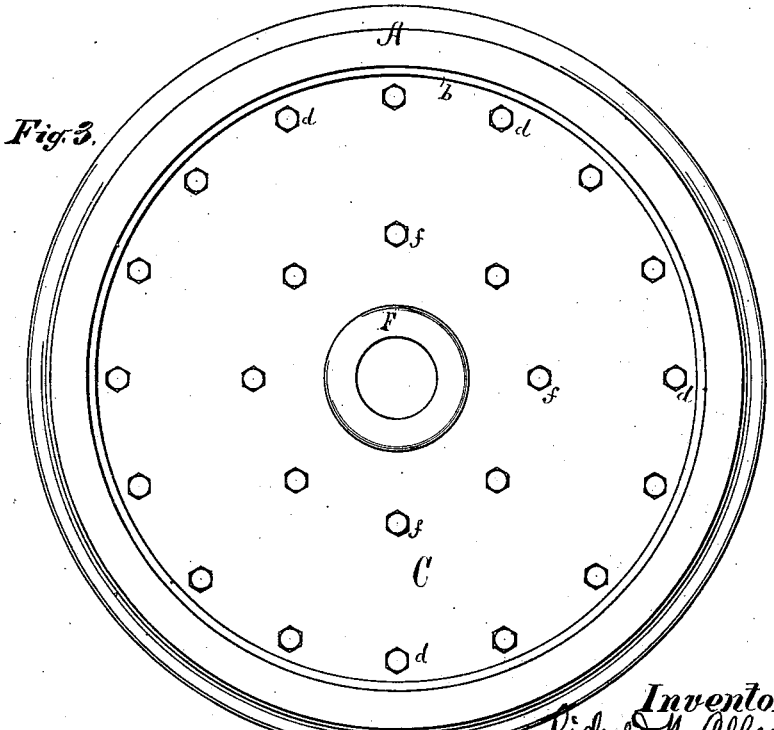

The invention is illustrated in the accompanying drawings, in which Figure 1 is a central sectional view of the improved wheel. Fig. 2 is a view in elevation of the back side of the same, and Fig. 3 is a view in elevation of the front side of the same.

In the drawings, A represents a tire, preferably formed without weld or joint, by forging and rolling from an ingot of steel or iron.

B is an annular web projecting from the inner wall of the rim or tread of the tire, and preferably located about midway thereof, and is provided with a series of bolt-holes.

C C are circular plates of iron or steel, preferably of wrought-iron, extending from the hub to the inner wall of the tire, and having their outer edges or peripheries provided with flanges $b\ b$. These plates are so constructed and arranged that the parts of their faces adjacent to their flanged edges will closely fit against the face of the web B, and the flanges $b\ b$ fit the inner wall of the tire adjacent to the said web, while their inner edges or peripheries are fitted to the hub.

D is a circular core or disk of prepared paper—preferably compressed paper or equivalent material—in thickness about equal to thickness of the web B, and having its outer periphery in close contact with the edge of the web B and its inner periphery in contact with the surface of the hub, and is located between the plates C C. The plates C C are provided with a series of bolt-holes near their outer peripheries, corresponding with the holes in the web B, and both the plates and the disk D are provided with a series of bolt-holes near their inner peripheries, corresponding with the holes in the flange E on the hub F.

$d\ d$, &c., are a series of bolts furnished with nuts $e\ e$, &c., by means of which the plates C C are drawn and held closely in contact with the web B on the one hand, while on the other hand they are secured to the hub by the bolts $f\ f$, &c., furnished with nuts $g\ g$, the disk or core D being clamped between them.

Instead of making the core or disk D of prepared paper, it may be formed of iron, steel, or wood, or other material which will fill the space between the plates C C and have its edge-bearings upon the web of the tire and the hub.

The above-described parts may be conveniently brought together and secured in place in the following way: The plates C C, with the interposed disk D, may be first forced into their respective positions upon the tire and secured by the bolts $d\ d$, and then the hub F may be forced into the circular opening through the center of the plates and the disk until the flange E is brought in contact with its adjacent plate and the inner edges of the plates and disk are in close contact with the surface of the hub, when the parts are firmly secured by the bolts $f\ f$ and nuts $g\ g$.

The series of bolt-holes, instead of being made in the separate parts before they are put in place, which would involve some difficulty in making the holes register, may be drilled through the required parts in the required places after the wheel has been partly or wholly built up, as above described, or otherwise.

In constructing this wheel the flanges $b\ b$ should be shaped to perfectly conform to the surfaces of the tire with which they are in contact, and the same condition should be present between any of the contact-surfaces of the adjacent parts—for instance, between the inner edges of the plates and disk and the surface of the hub, and the outer edge of the disk and the edge of the web, so that the shocks and blows caused by the impact of the tire upon the rails will be communicated directly to the flanges b b and to the outer edge of disk D, and thence uniformly distributed throughout the wheel. In this respect the present construction differs materially from that set forth in my application for a patent on car-wheels allowed August 10, 1880, in which the edges of the circular plates were not in close contact with the tire, and which permitted the main force of the shock to be communicated directly to the central disk of prepared paper instead of distributing it between the plates and the disk, as is the case in the present construction.

It is easily seen that a wheel constructed as herein described and shown can be made to possess great strength and durability for the weight of metal used, and that the tire can be readily removed when worn or broken and a new one substituted.

What is claimed as new is—

The combination, with the tire and hub of a car-wheel, of circular flanged plates C C and a disk or core, D, the several parts being arranged and united, substantially as and for the purpose set forth.

RICHARD N. ALLEN.

Witnesses:
JAMES KEARNEY,
BENJ. A. SMITH.